(12) United States Patent
Zhu et al.

(10) Patent No.: US 11,236,937 B2
(45) Date of Patent: Feb. 1, 2022

(54) COOLING CONTROL METHOD FOR REFRIGERATOR

(71) Applicant: QINGDAO HAIER JOINT STOCK CO., LTD., Qingdao (CN)

(72) Inventors: Xiaobing Zhu, Qingdao (CN); Chunyang Li, Qingdao (CN); Haibo Tao, Qingdao (CN)

(73) Assignee: QINGDAO HAIER JOINT STOCK CO., LTD., Qingdao (CN)

( * ) Notice: Subject to any disclaimer, the term of this patent is extended or adjusted under 35 U.S.C. 154(b) by 112 days.

(21) Appl. No.: 16/626,513

(22) PCT Filed: Jun. 28, 2018

(86) PCT No.: PCT/CN2018/093280
§ 371 (c)(1),
(2) Date: Dec. 24, 2019

(87) PCT Pub. No.: WO2019/001500
PCT Pub. Date: Jan. 3, 2019

(65) Prior Publication Data
US 2020/0284491 A1  Sep. 10, 2020

(30) Foreign Application Priority Data
Jun. 29, 2017  (CN) .......................... 201710516009.1

(51) Int. Cl.
F25D 11/02 (2006.01)
F25D 17/06 (2006.01)

(52) U.S. Cl.
CPC .............. *F25D 11/02* (2013.01); *F25D 17/06* (2013.01)

(58) Field of Classification Search
CPC .......... F25D 11/02; F25D 17/06; F25D 17/08; F25D 17/065; F25D 17/045;
(Continued)

(56) References Cited

U.S. PATENT DOCUMENTS

| 2009/0113923 | A1* | 5/2009 | Young ................... F25D 17/065 62/441 |
| 2018/0031299 | A1* | 2/2018 | Tao ........................ F25D 17/065 |
| 2018/0224186 | A1* | 8/2018 | Besore .................. F25D 17/045 |

FOREIGN PATENT DOCUMENTS

| CN | 203672041 U | 6/2014 |
| CN | 105091493 A | 11/2015 |

(Continued)

*Primary Examiner* — Ana M Vazquez
(74) *Attorney, Agent, or Firm* — Cheng-Ju Chiang

(57) ABSTRACT

A cooling control method for a refrigerator includes steps of measuring an actual temperature of freezer compartments, and setting a freezing parameter; if the actual temperature of at least one of the freezer compartments is higher than a freezing startup temperature, measuring an actual temperature of a refrigerator compartment, setting a refrigeration parameter, and if the actual temperature of the refrigerator compartment is higher than a refrigeration startup temperature and a difference between the actual temperature of at least one of the freezer compartments and the freezing startup temperature is higher than a preset value, re-setting the refrigeration parameter and the freezing parameter; and, according to the refrigeration parameter and the freezing parameter, causing a compressor, a fan, a refrigeration air door and a branch air supply device to operate in a preset state.

15 Claims, 5 Drawing Sheets

(58) Field of Classification Search
CPC ... F25D 29/005; F25D 2700/12; Y02B 40/00;
F25B 2600/112
USPC .......................................................... 62/115
See application file for complete search history.

(56) References Cited

FOREIGN PATENT DOCUMENTS

| | | | |
|---|---|---|---|
| CN | 105783411 | A | 7/2016 |
| CN | 106123450 | A | 11/2016 |
| CN | 107421202 | A | 12/2017 |
| JP | 2000-146400 | A | 5/2000 |
| WO | 2017/033144 | A1 | 3/2017 |

* cited by examiner

COOLING CONTROL METHOD FOR REFRIGERATOR

The present application is a 35 U.S.C. § 371 National Phase conversion of International (PCT) Patent Application No. PCT/CN2018/093280, filed on Jun. 28, 2018, which claims priority of Chinese Patent Application No. CN201710516009.1, filed on Jun. 29, 2017 and titled "COOLING CONTROL METHOD FOR REFRIGERATOR", which is incorporated herein by reference in its entirety. The PCT International Patent Application was filed and published in Chinese.

TECHNICAL FIELD

The present invention relates to the field of refrigeration control, and more particularly, to a cooling control method for a refrigerator and a computer storage medium.

BACKGROUND

With the increasing development of society and the continuous improvement of people's living standards, people's life rhythm is getting faster and faster, so they are more and more willing to buy a lot of food and put them in refrigerators. Thus, a refrigerator has become one of the indispensable household appliances in people's daily life.

However, an existing single-system air-cooled refrigerator provided with a refrigerator compartment and a freezer compartment has the following disadvantages: firstly, the refrigerator compartment cannot be refrigerated separately. Air is inevitably supplied to the freezer compartment at the time of refrigerating the refrigerator compartment. When hot air in the refrigerator compartment returns to an evaporator, the temperature of the evaporator rises fast, such that the temperature of the air blown from the evaporator becomes higher, resulting in a temperature rise of the freezer compartment, thereby bringing inconvenience to the temperature stability of the freezer compartment and affecting the storage effect of food. Secondly, the temperatures of freezer compartments cannot be controlled in zones respectively. With respect to a refrigerator having two freezer compartments, since the temperatures of the two freezer compartments are controlled by one sensor, the temperature uniformity and stability are poor, i.e., the temperature of one of the freezer compartments may be excessively high or the temperature of one of the freezer compartments may be excessively low, which will be disadvantageous to energy conservation and food preservation.

SUMMARY

An objective of the present invention is to improve the temperature stability of a storage space of a refrigerator.

A further objective of the present invention is to reduce the energy consumption of a refrigerator and improve a storage effect of food in the refrigerator.

Particularly, the present invention provides a cooling control method for a refrigerator, wherein the refrigerator comprises: a refrigerator body in which a refrigerator compartment and at least one freezer compartment arranged below the refrigerator compartment are defined; a door body arranged on the front side of the refrigerator body for a user to open or close the refrigerator compartment and the freezer compartment; a refrigeration system comprising a compressor and configured to supply cold capacity to the refrigerator compartment and the freezer compartment; a branch air supply device comprising a fan and provided with a refrigerating air outlet which is in controlled communication with the refrigerator compartment and a freezing air outlet which is in controlled communication with the freezer compartment, so as to supply the cold capacity supplied by the refrigeration system into the refrigerator compartment and/or the freezer compartment in a controlled manner; and a refrigerating air door configured to adjust the cold capacity conveyed to the refrigerator compartment in cooperation with the refrigerating air outlet; and the cooling control method comprises the following steps: measuring an actual temperature of each of the freezer compartments, and setting a freezing parameter of each freezer compartment according to the actual temperature of the freezer compartment; when the actual temperature of at least one of the freezer compartments is higher than a preset freezing startup temperature, measuring an actual temperature of the refrigerator compartment, and setting a refrigerating parameter of the refrigerator compartment according to the actual temperature of the refrigerator compartment; when the actual temperature of the refrigerator compartment is higher than a preset refrigerating startup temperature, and a difference value between the actual temperature of the at least one of the freezer compartments and the freezing startup temperature is higher than a first preset threshold, resetting the refrigerating parameter and the freezing parameter, wherein the refrigerating parameters and the freezing parameters each include a first parameter, a second parameter and a third parameter; and operating, according to a set of the refrigerating parameter and the freezing parameter, the compressor, the fan, the refrigeration air door and the branch air supply device in a preset state corresponding to the set.

Optionally, the freezer compartments include a first freezer compartment and a second freezer compartment; the freezing parameters include a first freezing parameter of the first freezer compartment and a second freezing parameter of the second freezer compartment; and freezing air outlets of the branch air supply device include a first freezing air outlet which is in controlled communication with the first freezer compartment and a second freezing air outlet which is in controlled communication with the second freezer compartment; and a step of setting the first freezing parameter comprises: determining whether an actual temperature of the first freezer compartment is higher than a preset first freezing startup temperature; and if yes, setting the first freezing parameter as the second parameter, and if not, setting the first freezing parameter as the first parameter; and a step of setting the second freezing parameter comprises: determining whether an actual temperature of the second freezer compartment is higher than a preset second freezing startup temperature; and if yes, setting the second freezing parameter as the second parameter, and if not, setting the second freezing parameter as the first parameter.

Optionally, when the actual temperature of the first freezer compartment is higher than the first freezing startup temperature or the actual temperature of the second freezer compartment is higher than the second freezing startup temperature, a step of setting the refrigerating parameter of the refrigerator compartment comprises: determining whether the actual temperature of the refrigerator compartment is higher than the preset refrigerating startup temperature; and if yes, setting the refrigerating parameter as the second parameter, and if not, setting the refrigerating parameter as the first parameter.

Optionally, when the actual temperature of the first freezer compartment is less than or equal to the first freezing startup temperature or the actual temperature of the second freezer compartment is less than or equal to the second freezing startup temperature, the refrigerating parameter is set as the first parameter.

Optionally, the step of resetting the refrigerating parameter and the freezing parameter comprises: determining whether a difference value between the actual temperature of the first freezer compartment and the first freezing startup temperature is higher than the first preset threshold; and if yes, setting the refrigerating parameter as the first parameter, and setting the first freezing parameter as the third parameter; and if not, setting the first freezing parameter as the first parameter; determining whether a difference value between the actual temperature of the second freezer compartment and the second freezing startup temperature is higher than the first preset threshold; and if yes, setting the refrigerating parameter as the first parameter, and setting the second freezing parameter as the third parameter; and if not, setting the second freezing parameter as the first parameter.

Optionally, after the step of resetting the refrigerating parameter, further comprising: determining whether a difference value between the actual temperature of the refrigerator compartment and the refrigerating startup temperature is higher than a second preset threshold; and if yes, setting the refrigerating parameter as the third parameter, and if not, keeping the refrigerating parameter being the first parameter unchanged.

Optionally, when the refrigerating parameter, the first freezing parameter and the second freezing parameter are the first parameter respectively, the compressor and the fan are turned off; the refrigerating air door is closed; and the refrigerating air outlet, the first freezing air outlet and the second freezing air outlet of the branch air supply device are all closed.

Optionally, when the refrigerating parameter and the first freezing parameter are the first parameter respectively, and the second freezing parameter is the second parameter, the compressor is operated at a preset second compressor speed; the fan is operated at a preset second fan speed; the refrigerating air door is closed; the refrigerating air outlet and the first freezing air outlet of the branch air supply device are closed; and the second freezing air outlet is opened.

Optionally, when the refrigerating parameter and the second freezing parameter are the first parameter respectively, and the first freezing parameter is the second parameter, the compressor is operated at the second compressor speed; the fan is operated at the second fan speed; the refrigerating air door is closed; the refrigerating air outlet and the second freezing air outlet of the branch air supply device are closed; and the first freezing air outlet of the branch air supply device is opened.

Optionally, when the refrigerating parameter is the first parameter, and the first freezing parameter and the second freezing parameter are the second parameter respectively, the compressor is operated at a third compressor speed which is higher than or equal to the second compressor speed; the fan is operated at a third fan speed which is higher than or equal to the second fan speed; the refrigerating air door is closed; the refrigerating air outlet of the branch air supply device is closed; and the first freezing air outlet and the second freezing air outlet of the branch air supply device are opened.

Optionally, when the refrigerating parameter is the second parameter, and the first freezing parameter and the second freezing parameter are the first parameter respectively, the compressor is operated at a first compressor speed which is less than or equal to the second compressor speed; the fan is operated at a first fan speed which is less than or equal to the second fan speed; the refrigerating air door is opened; the refrigerating air outlet of the branch air supply device is opened; and the first freezing air outlet and the second freezing air outlet of the branch air supply device are closed.

Optionally, when the refrigerating parameter and the first freezing parameter are the first parameter respectively, and the second freezing parameter is the third parameter, the compressor is operated at a fourth compressor speed which is higher than or equal to the third compressor speed; the fan is operated at a fourth fan speed which is higher than or equal to the third fan speed; the refrigerating air door is closed; the refrigerating air outlet and the first freezing air outlet of the branch air supply device are closed; and the second freezing air outlet of the branch air supply device is opened.

Optionally, when the refrigerating parameter and the second freezing parameter are the first parameter respectively, and the first freezing parameter is the third parameter, the compressor is operated at the fourth compressor speed; the fan is operated at the fourth fan speed; the refrigerating air door is closed; the refrigerating air outlet and the second freezing air outlet of the branch air supply device are closed; and the first freezing air outlet of the branch air supply device is opened.

Optionally, when the refrigerating parameter and the second freezing parameter are the third parameter respectively, and the first freezing parameter is the first parameter, the compressor is operated at a fifth compressor speed which is higher than or equal to the fourth compressor speed; the fan is operated at a fifth fan speed which is higher than or equal to the fourth fan speed; the refrigerating air door is opened; the refrigerating air outlet and the second freezing air outlet of the branch air supply device are opened; and the first freezing air outlet of the branch air supply device is closed.

Optionally, when the refrigerating parameter and the first freezing parameter are the third parameter respectively, and the second freezing parameter is the first parameter, the compressor is operated at the fifth compressor speed; the fan is operated at the fifth fan speed; the refrigerating air door is opened; the refrigerating air outlet and the first freezing air outlet of the branch air supply device are opened; and the second freezing air outlet of the branch air supply device is closed.

Optionally, when the refrigerating parameter is the first parameter, and the first freezing parameter and the second freezing parameter are the third parameter respectively, the compressor is operated at a sixth compressor speed which is higher than or equal to the fifth compressor speed; the fan is operated at a sixth fan speed which is higher than or equal to the fifth fan speed; the refrigerating air door is closed; the refrigerating air outlet of the branch air supply device is closed; and the first freezing air outlet and the second freezing air outlet of the branch air supply device are opened.

Optionally, when the refrigerating parameter, the first freezing parameter and the second freezing parameter are the third parameter respectively, the compressor is operated at a seventh compressor speed which is higher than or equal to the sixth compressor speed; the fan is operated at a seventh fan speed which is higher than or equal to the sixth fan speed; the refrigerating air door is opened; and the refrigerating air outlet, the first freezing air outlet and the second freezing air outlet of the branch air supply device are all opened.

According to another objective, the present invention provides a computer storage medium, the computer storage medium stores computer programs, and when the computer programs are running, a device in which the computer storage medium is located is caused to execute the cooling control method for the refrigerator of any of the above embodiments.

The present invention provides a cooling control method for a refrigerator and a computer storage medium, which can realize separate refrigeration of a single storage space or simultaneous refrigeration of a plurality of storage spaces, satisfy the refrigeration demand of each storage space in comprehensive consideration of the actual temperature conditions of a refrigerator compartment and a freezer compartment, and improve the temperature stability of the storage space of the refrigerator, by means of the following steps: measuring an actual temperature of each freezer compartment, and setting a freezing parameter of each freezer compartment according to the actual temperature of the freezer compartment; when the actual temperature of at least one of the freezer compartments is higher than a preset freezing startup temperature, measuring an actual temperature of a refrigerator compartment, and setting a refrigerating parameter of the refrigerator compartment according to the actual temperature of the refrigerator compartment; when the actual temperature of the refrigerator compartment is higher than a preset refrigerating startup temperature, and a difference value between the actual temperature of at least one of the freezer compartments and the freezing startup temperature is higher than a first preset threshold, resetting the refrigerating parameter and the freezing parameter; and operating, according to a set of the refrigerating parameter and the freezing parameter, a compressor, a fan, a refrigerating air door and a branch air supply device in a preset state corresponding to this set.

Further, according to the cooling control method for the refrigerator and the computer storage medium of the present invention, the freezer compartments of the refrigerator include a first freezer compartment and a second freezer compartment; the freezing parameters include a first freezing parameter of the first freezer compartment and a second freezing parameter of the second freezer compartment; freezing air outlets of the branch air supply device include a first freezing air outlet which is in controlled communication with the first freezer compartment and a second freezing air outlet which is in controlled communication with the second freezer compartment; when the actual temperature of at least one of the freezer compartments is higher than a preset freezing startup temperature, if the actual temperature of the refrigerator compartment is higher than a preset refrigerating startup temperature, it is necessary to determine an urgency degree of refrigeration need of the freezer compartment, to reset the refrigerating parameter and the freezing parameters; when a difference value between the actual temperature of each freezer compartment and the freezing startup temperature is higher than a first preset threshold and a difference value between the actual temperature of the refrigerator compartment and the refrigerating startup temperature is higher than a second preset threshold, the refrigerating parameter is further set to determine the urgency degrees of the refrigeration demands of different storage spaces and to preferentially satisfy the storage space that needs refrigeration more urgently. The cooling control method is more scientific and reasonable, prevents the temperature of a storage space from being excessively high or excessively low due to poor temperature uniformity and stability of each storage space, and can effectively reduce the energy consumption and promote the storage effect of food in each storage space.

The above and other objectives, advantages and features of the present invention will be understood by those skilled in the art more clearly with reference to the detailed description of the specific embodiments of the present invention below with reference to the accompanied drawings.

BRIEF DESCRIPTION OF THE DRAWINGS

The followings will describe some specific embodiments of the present invention in detail in an exemplary rather than restrictive manner with reference to the accompanying drawings. The same reference signs in the drawings represent the same or similar components or parts. Those skilled in the art shall understand that these drawings may not be necessarily drawn according to the scales. In the drawings.

DETAILED DESCRIPTION

Figure 1:
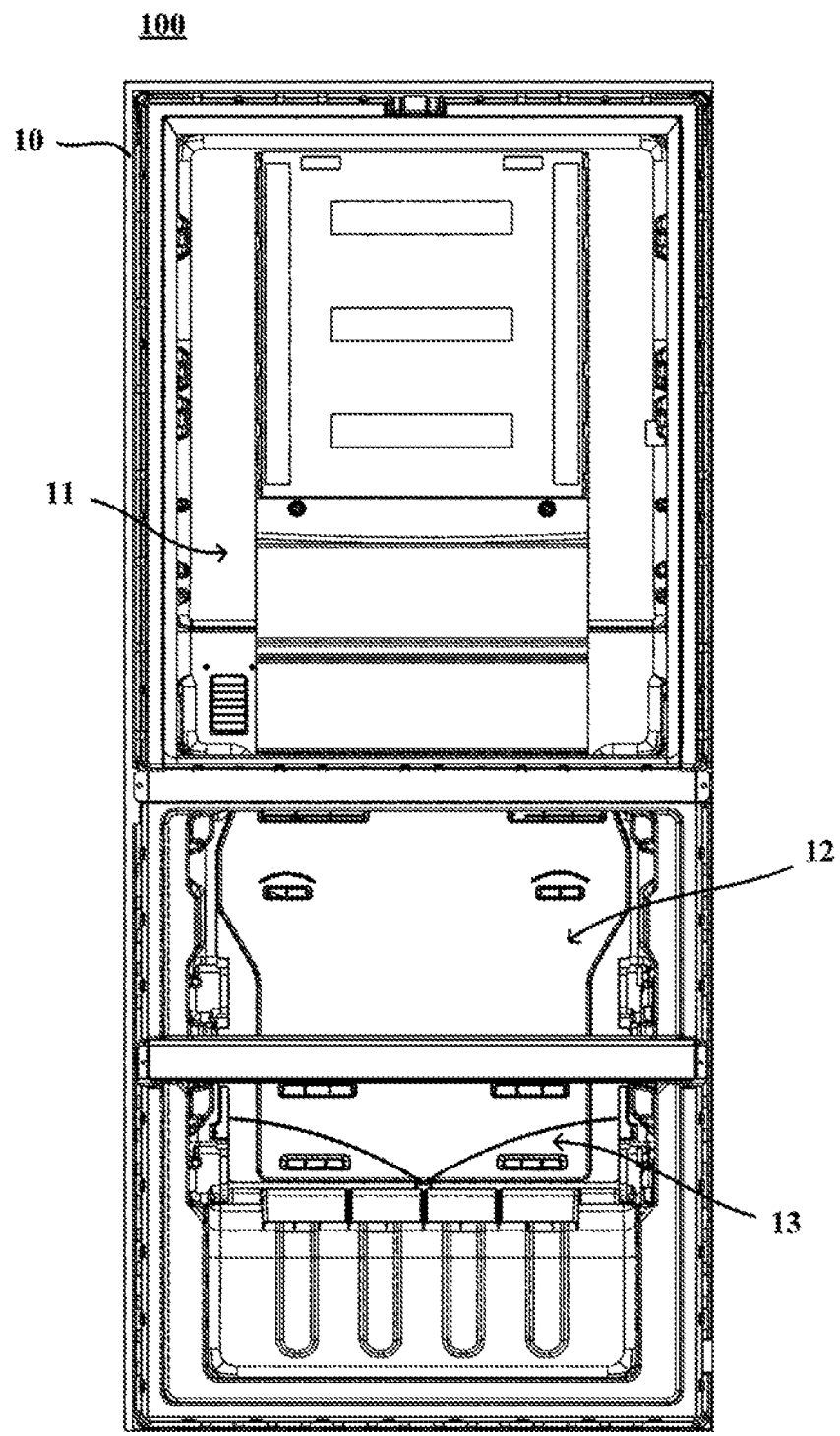
FIG. 1 is a schematic structural diagram of a refrigerator to which a cooling control method for a refrigerator according to an embodiment of the present invention is applicable.

The present embodiment firstly provides a cooling control method for a refrigerator, which can realize separate refrigeration of a single storage space or simultaneous refrigeration of a plurality of storage spaces, implement refrigeration more reasonably and satisfy the refrigeration demand of each storage space in comprehensive consideration of the actual temperature conditions of a refrigerator compartment and a freezer compartment, and improve the temperature stability of each storage space of the refrigerator. FIG. 1 is a schematic structural diagram of a refrigerator 100 to which a cooling control method for a refrigerator according to an embodiment of the present invention is applicable. This refrigerator 100 may generally comprise a refrigerator body 10, a door body, a refrigeration system, a branch air supply device 20 and a refrigerating air door.

A plurality of storage spaces may be defined inside the refrigerator body 10. The number and structures of the storage spaces may be configured as required. FIG. 1 shows a case where a first space, a second space and a third space are arranged vertically in sequence. The above storage spaces may be configured as a refrigerator compartment, a freezer compartment, a temperature changing space or a fresh keeping space according to different uses. The interior of each storage space may be divided into a plurality of storage areas by partition plates, and articles are stored by shelves or drawers. A refrigerator compartment 11 and at least one freezer compartment arranged below the refrigerator compartment 11 are defined inside the refrigerator body 10 of the refrigerator 100 of the present embodiment. There are two freezer compartments, which are a first freezer compartment 12 and a second freezer compartment 13 respectively, in the present embodiment. That is, the refrigerator 100 in the present embodiment is provided with the refrigerator compartment 11, the first freezer compartment 12 and the second freezer compartment 13 which are arranged in sequence from top to bottom. In other embodiments, the refrigerator 100 may be provided with only one refrigerator compartment and one freezer compartment.

The door body 20 is arranged on the front side of the refrigerator body 10, for a user to open or close the storage spaces of the refrigerator 100. The storage spaces of the refrigerator 100 in the present embodiment include the refrigerator compartment 11, the first freezer compartment 12 and the second freezer compartment 13. The door body may be arranged to correspond to the storage spaces, i.e., each storage space corresponds to one or more door bodies. While the number of the storage spaces and the door bodies and the functions of the storage spaces may be selected actually according to specific situations. In other embodiments, each storage space may be opened in a drawer manner so as to realize a drawer type storage space.

The refrigeration system of the refrigerator 100 is configured to supply cold capacity to the storage spaces. The refrigeration system of the present embodiment comprises a compressor which may be mounted in a compressor cabin. Specifically, the refrigeration system may be a refrigerating cycle system composed of a compressor, a condenser, a throttling device, an evaporator and the like. The refrigerator body 10 may be internally provided with a cooling space in which the evaporator of the refrigeration system may be arranged. As is known to those skilled in the art, the refrigerating system may also be other types of refrigeration systems, such as a semiconductor refrigeration system whose cold-end diffuser may be arranged in the cooling space. The storage spaces of the refrigerator 100 of the present embodiment include the refrigerator compartment 11, the first freezer compartment 12, and the second freezer compartment 13 from top to bottom. The refrigeration system supplies different cold capacities to the refrigerator compartment 11 and the freezer compartments, such that the temperature in the refrigerator compartment 11 is different from the temperature in each freezer compartment. The temperature in the refrigerator compartment 11 is generally between 2° C. and 10° C., preferably between 3° C. and 8° C. The temperature in each freezer compartment is generally between −22° C. and −14° C. The optimal storage temperatures for different types of foods are not the same, and further the storage spaces suitable for their storage are also different. For example, fruit and vegetable foods are suitable for storage in the refrigerator compartment 11, while meat foods are suitable for storage in the freezer compartments.

Figure 2:
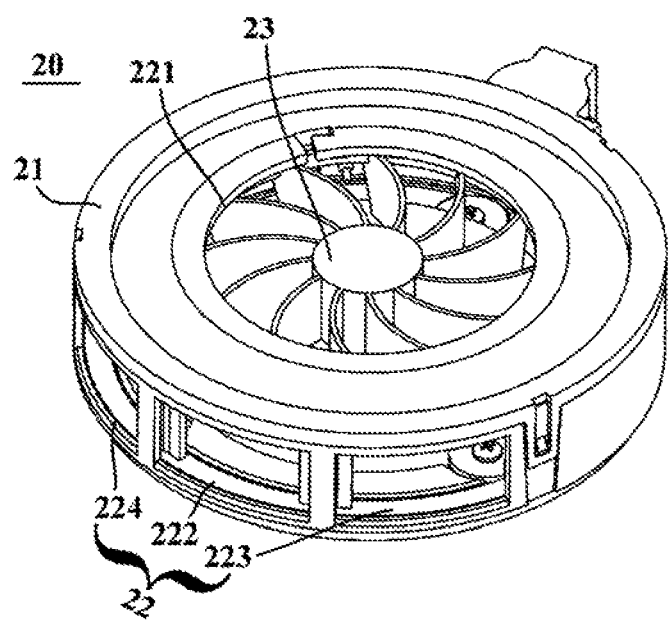
FIG. 2 is a schematic structural diagram of a branch air supply device in the refrigerator in FIG. 1.

FIG. 2 is a schematic structural diagram of the branch air supply device 20 in the refrigerator 100 in FIG. 1. The branch air supply device 20 may generally comprise a housing 21 and an adjustment member (not shown in the drawings due to being disposed inside the housing 21). The housing 21 may be provided with at least one air inlet 221 and a plurality of air outlets 22, such that air flow enters into the housing 21 via the at least one air inlet 221 and flows out of the housing 21 via the plurality of air outlets 22. The adjustment member may be configured to completely shield, partially shield, or fully expose each of the air outlets 22 in a controlled manner to adjust respective air discharge areas of the plurality of air outlets 22. For example, the adjustment member may completely shield, partially shield or completely expose each of the air outlets 22 at different locations. The adjustment member of the branch air supply device 20 in the embodiment of the present invention can controllably allocate cold air flowing in from the air inlet 221 to the plurality of air outlets 22, and can control an air outlet duct that is communicated with each air outlet 22 to be opened or closed, and/or adjust an air discharge amount in each air outlet duct, so as to further satisfy the demands of different storage spaces to the cold capacity.

The branch air supply device 20 in the present embodiment may be provided with three air outlets which may be sequentially arranged at intervals in a circumferential direction of the housing 21. The three air outlets 22 include a refrigerating air outlet 222 which is in controlled communication with the refrigerator compartment 11, a first freezing air outlet 223 which is in controlled communication with the first freezer compartment 12, and a second freezing air outlet 224 which is in controlled communication with the second freezer compartment 13, such that cold capacity supplied by the refrigeration system is fed to the refrigerator compartment 11 and/or the first freezer compartment 12 and/or the second freezer compartment 13 in a controlled manner. In other embodiments, when the refrigerator 100 is provided with only one refrigerator compartment and one freezer compartment, the branch air supply device 20 may be provided with only two air outlets, which are in controlled communication with the refrigerator compartment and the freezer compartment, respectively.

The fan 23 in the branch air supply device 20 of the present embodiment is configured to cause air flow to flow into the housing 21 from the at least one air inlet 221 and to flow out of the housing 21 via one or more of the plurality of air outlets 22 so as to improve the air supply efficiency. The fan 23 may enable the branch air supply device 20 in the embodiment of the present invention to independently introduce air thereinto. Further, in some embodiments, the fan 23 may be a centrifugal impeller and arranged in the housing 21. In some alternative embodiments, the fan 23 may also be an axial flow fan, an axial flow ventilator or a centrifugal fan and arranged at the air inlet 221 of the housing 21. Obviously, when the fan 23 is a centrifugal impeller and is located in the housing 21, the branch air supply device 20 is compact in structure and small in size.

A refrigerating air door is configured to adjust the cold capacity conveyed to the refrigerator compartment 11 in cooperation with the refrigerating air outlet 222. The refrigerating air door (not shown in drawings) is arranged at the bottom of the refrigerator compartment 11. In order to avoid a case in which the temperature of the refrigerator compartment 11 is too low due to air leakage when the refrigerating air outlet 222 is closed, the sealability may be further ensured by the refrigerating air door, and then the temperature of the refrigerator compartment 11 is controlled more precisely.

Figure 3:
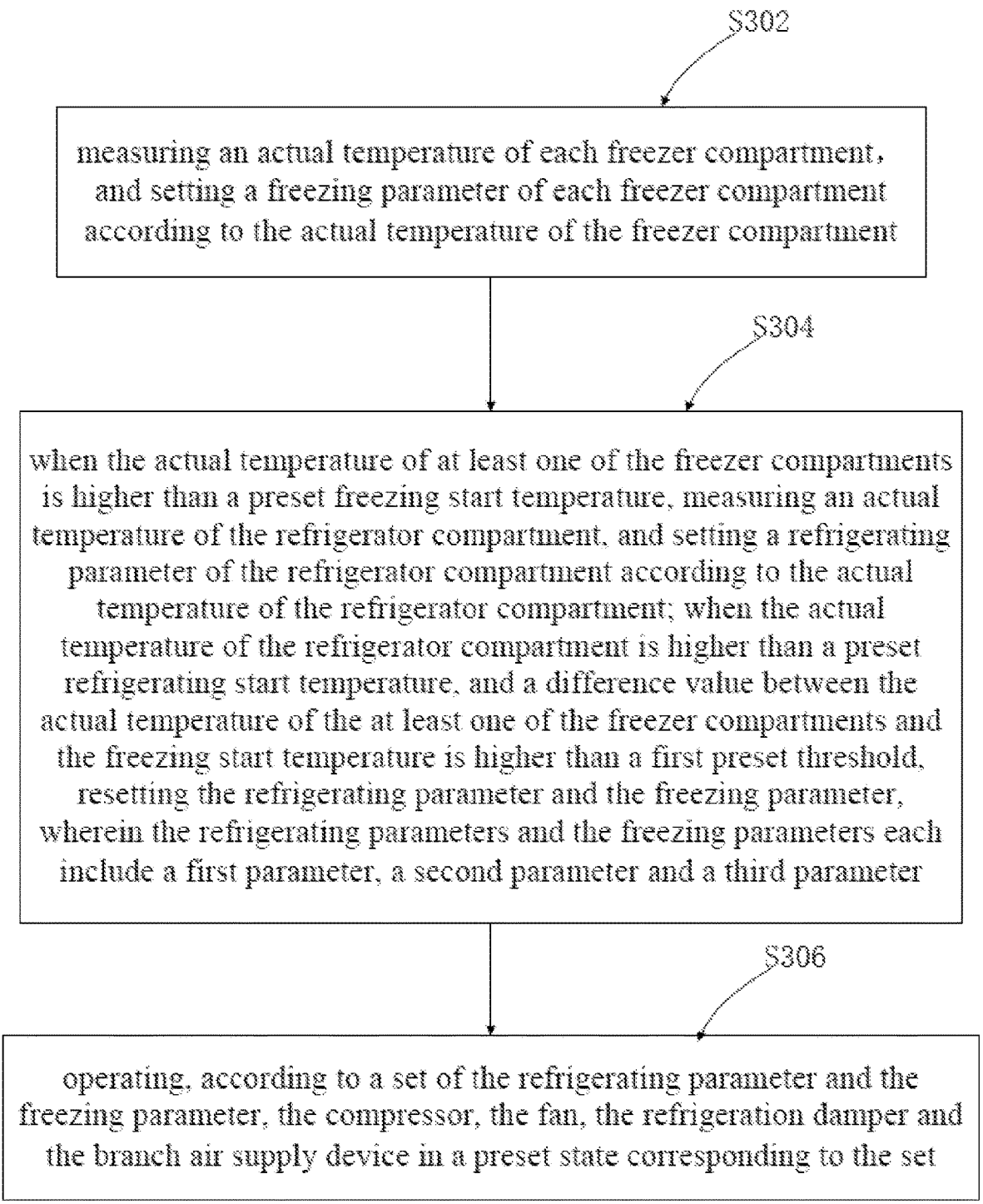
FIG. 3 is a schematic diagram of a cooling control method for a refrigerator according to an embodiment of the present invention.

FIG. 3 is a schematic diagram of a cooling control method for a refrigerator according to an embodiment of the present invention. The cooling control method of the refrigerator may be applicable to the refrigerator 100 of any of the above embodiments. As shown in FIG. 3, in the food-based refrigerator temperature control method, the following steps are performed:

step S302, measuring an actual temperature of each freezer compartment, and setting a freezing parameter of each freezer compartment according to the actual temperature of the freezer compartment;

step S304, when the actual temperature of at least one of the freezer compartments is higher than a preset freezing startup temperature, measuring an actual temperature of a refrigerator compartment 11, and setting a refrigerating parameter of the refrigerator compartment 11 according to the actual temperature of the refrigerator compartment 11; when the actual temperature of the refrigerator compartment 11 is higher than a preset refrigerating startup temperature, and a difference value between the actual temperature of at least one of the freezer compartments and the freezing startup temperature is higher than a first preset threshold, resetting the refrigerating parameter and the freezing parameter; and step S306, operating, according to a set of the refrigerating parameter and the freezing parameter, a compressor, a fan 23, a refrigeration air door and a branch air supply device 20 in a preset state corresponding to the set.

In step S302 and step S304, the actual temperatures of the refrigerator compartment 11 and the freezer compartments may be measured by temperature sensors arranged in the refrigerator compartment 11 and the freezer compartments. The types, sizes and mounting positions of the temperature sensors may be set according to actual demands and conditions. The refrigerator 100 of the present embodiment is provided with a refrigerator compartment 11, a first freezer compartment 12 and a second freezer compartment 13, and temperature sensors may be arranged in the three storage spaces respectively to measure the actual temperatures of the three storage spaces.

The refrigerating parameters and the freezing parameters in the step S302 and step S304 each include a first parameter, a second parameter and a third parameter which are all different. For example, the first parameter may be 0, the second parameter may be 1, and the third parameter may be 2. The three parameters may indicate whether each storage space needs refrigeration and the urgency degree of refrigeration need of each storage space. For example, the first parameter 0 indicates that refrigeration is not needed, the second parameter 1 and the third parameter 2 indicate that refrigeration is needed, and the third parameter 2 can indicate that the refrigeration need is more urgent than the second parameter 1. The specific values of the above three parameters are merely examples, and are not intended to limit the present invention. In other embodiments, the three parameters may be other different three values.

Since the refrigerator 100 of the present embodiment is provided with the refrigerator compartment 11, the first freezer compartment 12 and the second freezer compartment 13, the freezing parameters may include a first freezing parameter of the first freezer compartment 12 and a second freezing parameter of the second freezer compartment 13. That is, a set of the parameters in step S306 refers to a set of three values. In other embodiments, when the refrigerator 100 is provided with only one refrigerator compartment and one freezer compartment, a set of parameters may be a set of two values.

The step S302 of setting the freezing parameters of the freezer compartments comprises: setting the first freezing parameter of the first freezer compartment 12 and the second freezing parameter of the second freezer compartment 13. Specifically, the step of setting the first freezing parameter may comprise: determining whether an actual temperature of the first freezer compartment 12 is higher than a preset first freezing startup temperature; and if yes, setting the first freezing parameter as the second parameter, and if not, setting the first freezing parameter as the first parameter. The step of setting the second freezing parameter comprises: determining whether an actual temperature of the second freezer compartment 13 is higher than a preset second freezing startup temperature; and if yes, setting the second freezing parameter as the second parameter, and if not, setting the second freezing parameter as the first parameter.

In the step S304, when the actual temperature of at least one of the freezer compartments is higher than the preset freezing startup temperature, that is, when the actual temperature of the first freezer compartment 12 is higher than a first freezing startup temperature or the actual temperature of the second freezer compartment 13 is higher than a second freezing startup temperature, the actual temperature of the refrigerator compartment 11 may be measured, and the refrigerating parameter of the refrigerator compartment 11 may be set according to the actual temperature of the refrigerator compartment 11. Specifically, whether the actual temperature of the refrigerator compartment 11 is higher than a preset refrigerating startup temperature may be determined; and if yes, the refrigerating parameter is set as the second parameter, and if not, the refrigerating parameter is set as the first parameter. In addition, when the actual temperature of the refrigerator compartment 11 is higher than the preset refrigerating startup temperature and a difference value between the actual temperature of at least one of the freezer compartments and the freezing startup temperature is higher than the first preset threshold, the refrigerating parameter and the freezing parameter are reset. Therefore, a storage space that is more urgently needed to be refrigerated may be determined, such that the storage space that is more urgently needed to be refrigerated is refrigerated. Thus, the cooling control method is more scientific and reasonable.

The step of resetting the refrigerating parameter and the freezing parameters may comprise: determining whether a difference value between the actual temperature of the first freezer compartment 12 and the first freezing startup temperature is higher than the first preset threshold; and if yes, setting the refrigerating parameter as the first parameter, and setting the first freezing parameter as the third parameter, and if not, setting the first freezing parameter as the first parameter; determining whether a difference value between the actual temperature of the second freezer compartment 13 and the second freezing startup temperature is higher than the first preset threshold; and if yes, setting the refrigerating parameter as the first parameter, and setting the second freezing parameter as the third parameter, and if not, setting the second freezing parameter as the first parameter.

After the step of resetting the refrigerating parameter, the cooling control method for the refrigerator may further comprise: determining whether a difference value between the actual temperature of the refrigerator compartment 11 and the refrigerating startup temperature is higher than a second preset threshold; and if yes, setting the refrigerating parameter as the third parameter, and if not, keeping the refrigerating parameter being the first parameter unchanged. Thereby, it may be further determined whether the actual temperature of the refrigerator compartment is excessively high and whether there is an urgent refrigeration need.

Since the refrigerator 100 of the present embodiment is provided with two freezer compartments, i.e., the first freezer compartment 12 and the second freezer compartment 13, as long as the actual temperature of one of the freezer compartments is higher than the preset freezing startup temperature, that is, when the first freezer compartment 12 or the second freezer compartment 13 needs to be refrigerated, it is necessary to determine whether the refrigerator compartment 11 has a refrigeration need. If the refrigerator compartment 11 also has the refrigeration need, the freezer compartment is considered to be refrigerated only in the case where the actual temperature of the first freezer compartment 12 or the second freezer compartment 13 (having a difference value from the preset freezing startup temperature being greater than the first preset threshold) is excessively high. If the actual temperature of the first freezer compartment 12 or the second freezer compartment 13 is only higher than the freezing startup temperature and is not excessively high, the refrigerator compartment 11 is preferentially refrigerated.

The actual temperature of the refrigerator compartment 11 may be measured, and the refrigerating parameter of the refrigerator compartment 11 may be set according to the actual temperature of the refrigerator compartment 11, only in the case where the actual temperature of at least one of the freezer compartments is higher than the preset freezing startup temperature, that is, when the actual temperature of the first freezer compartment 12 is higher than the first freezing startup temperature or the actual temperature of the second freezer compartment 13 is higher than the second freezing startup temperature. If the actual temperature of the first freezer compartment 12 is less than or equal to the first freezing startup temperature and the actual temperature of the second freezer compartment 13 is less than or equal to the second freezing startup temperature, that is, when none of the freezer compartments needs to be refrigerated, the refrigerating parameter may be directly set as the first parameter, that is, the refrigerator compartment does not need to be refrigerated by default, so that the startup frequency of devices, such as a compressor may be reduced, and the energy consumption may be effectively reduced.

The different sets of refrigerating parameters and freezing parameters in step S306 correspond to different preset states of the compressor, the fan 23, the refrigerating air door and branch air supply device 20. Specifically, A state information table in which preset states corresponding to different parameter sets are pre-stored may be preset. After a parameter set is determined, the corresponding preset state may be obtained by matching. Each preset state includes: a rotational speed of the compressor and the fan 23; an open/close state of the refrigerating air door; and open/close states of the refrigerating air outlet 222, the first freezing air outlet 223, and the second freezing air outlet 224 of the branch air supply device 20.

A specific example of a state information table will be introduced below.

When the refrigerating parameter, the first freezing parameter and the second freezing parameter are the first parameter respectively, the corresponding preset state is as follows: the compressor and the fan 23 are turned off, the refrigerating air door is closed, and the refrigerating air outlet 222, the first freezing air outlet 223 and the second freezing air outlet 224 of the branch air supply device 20 are all closed.

When the refrigerating parameter and the first freezing parameter are the first parameter respectively, and the second freezing parameter is the second parameter, the corresponding preset state is as follows: the compressor operates at a preset second compressor speed; the fan 23 operates at a preset second fan speed; the refrigerating air door is closed; the refrigerating air outlet 222 and the first freezing air outlet 223 of the branch air supply device 20 are closed; and the second freezing air outlet 224 of the branch air supply device 20 is opened.

When the refrigerating parameter and the second freezing parameter are the first parameter respectively, and the first freezing parameter is the second parameter, the corresponding preset state is as follows: the compressor operates at the second compressor speed; the fan 23 operates at the second fan speed; the refrigerating air door is closed; the refrigerating air outlet 222 and the second freezing air outlet 224 of the branch air supply device 20 are closed; and the first freezing air outlet 223 of the branch air supply device 20 is opened.

When the refrigerating parameter is the first parameter, the first freezing parameter and the second freezing parameter are the second parameter respectively, the corresponding preset state is as follows: the compressor operates at a third compressor speed which is higher than or equal to the second compressor speed; the fan 23 operates at a third fan speed which is higher than or equal to the second fan speed; the refrigerating air door is closed; the refrigerating air outlet 222 of the branch air supply device 20 is closed; and the first freezing air outlet 223 and the second freezing air outlet 224 of the branch air supply device 20 are opened.

When the refrigerating parameter is the second parameter, the first freezing parameter and the second freezing parameter are the first parameter respectively, the corresponding preset state is as follows: the compressor operates at a first compressor speed which is less than or equal to the second compressor speed; the fan 23 operates at a first fan speed which is less than or equal to the second fan speed; the refrigerating air door is opened; the refrigerating air outlet 222 of the branch air supply device 20 is opened; and the first freezing air outlet 223 and the second freezing air outlet 224 of the branch air supply device 20 are closed.

When the refrigerating parameter and the first freezing parameter are the first parameter respectively, and the second freezing parameter is the third parameter, the corresponding preset state is as follows: the compressor operates at a fourth compressor speed which is higher than or equal to the third compressor speed; the fan 23 operates at a fourth fan speed which is higher than or equal to the third fan speed; the refrigerating air door is closed; the refrigerating air outlet 222 and the first freezing air outlet 223 of the branch air supply device 20 are closed; and the second freezing air outlet 224 of the branch air supply device 20 is opened.

When the refrigerating parameter and the second freezing parameter are the first parameter respectively, and the first freezing parameter is the third parameter, the corresponding preset state is as follows: the compressor operates at a fourth compressor speed; the fan 23 operates at a fourth fan speed; the refrigerating air door is closed; the refrigerating air outlet 222 and the second freezing air outlet 224 of the branch air supply device 20 are closed; and the first freezing air outlet 223 of the branch air supply device 20 is opened.

When the refrigerating parameter and the second freezing parameter are the third parameter respectively, and the first freezing parameter is the first parameter, the corresponding preset state is as follows: the compressor operates at a fifth compressor speed which is higher than or equal to the fourth compressor speed; the fan 23 operates at a fifth fan speed which is higher than or equal to the fourth fan speed; the refrigerating air door is opened; the refrigerating air outlet 222 and the second freezing air outlet 224 of the branch air supply device 20 are opened; and the first freezing air outlet 223 is closed.

When the refrigerating parameter and the first freezing parameter are the third parameter respectively, and the second freezing parameter is the first parameter, the corresponding preset state is as follows: the compressor operates at the fifth compressor speed; the fan operates at the fifth fan speed; the refrigerating air door is opened; the refrigerating air outlet 222 and the first freezing air outlet 223 of the branch air supply device 20 are opened; and the second freezing air outlet 224 of the branch air supply device 20 is closed.

When the refrigerating parameter is the first parameter, and the first freezing parameter and the second freezing parameter are the third parameter respectively, the corresponding preset state is as follows: the compressor operates at a sixth compressor speed which is higher than or equal to the fifth compressor speed; the fan operates at a sixth fan speed which is higher than or equal to the fifth fan speed; the refrigerating air door is closed; the refrigerating air outlet 222 of the branch air supply device 20 is closed; and the first freezing air outlet 223 and the second freezing air outlet 224 of the branch air supply device 20 are opened.

When the refrigerating parameter, the first freezing parameter and the second freezing parameter are the third parameter respectively, the corresponding preset state is as follows: the compressor operates at a seventh compressor speed which is higher than or equal to the sixth compressor speed; the fan operates at a seventh fan speed which is higher than or equal to the sixth fan speed; the refrigerating air door is opened; and the refrigerating air outlet 222, the first freezing air outlet 223 and the second freezing air outlet 224 of the branch air supply device 20 are all opened.

It should be noted that, in step S306, the compressor, the fan 23, the refrigerating air door and the branch air supply device 20 may operate for a preset duration according to a preset state corresponding to a set so as to satisfy the refrigerating demand of each storage space. During the process of operating for the preset duration, the process of measuring a temperature and setting a parameter is no longer performed, such that a case in which a storage space is determined to be not needing refrigeration once an actual temperature of the storage space is slightly lowered, resulting in a frequent change in an operating state of devices, such as a compressor, may be avoided. After the preset duration of operation, the above steps may be re-executed to perform the refrigeration control again.

The cooling control method for the refrigerator of the present embodiment can realize separate refrigeration of a single storage space or simultaneous refrigeration of a plurality of storage spaces, determine a storage space that needs to be refrigerated more urgently in comprehensive consideration of the actual temperature conditions of the refrigerator compartment and the freezer compartments so as to implement refrigeration more reasonably and satisfy the refrigeration demand of each storage space, and improve the temperature stability of each storage space of the refrigerator, by means of the following steps: measuring the actual temperature of each freezer compartment, and setting the freezing parameter of each freezer compartment according to the actual temperature of the freezer compartment; when the actual temperature of at least one of the freezer compartments is higher than the preset freezing startup temperature, measuring the actual temperature of the refrigerator compartment 11, and setting the refrigerating parameter of the refrigerator compartment 11 according to the actual temperature of the refrigerator compartment 11; when the actual temperature of the refrigerator compartment 11 is higher than the preset refrigerating startup temperature, and the difference value between the actual temperature of at least one of the freezer compartments and the freezing startup temperature is higher than the first preset threshold, resetting the refrigerating parameter and the freezing parameter; and operating, according to the set of the refrigerating parameter and the freezing parameter, the compressor, the fan 23, the refrigeration air door and the branch air supply device 20 in the preset state corresponding to the set.

Figure 4:
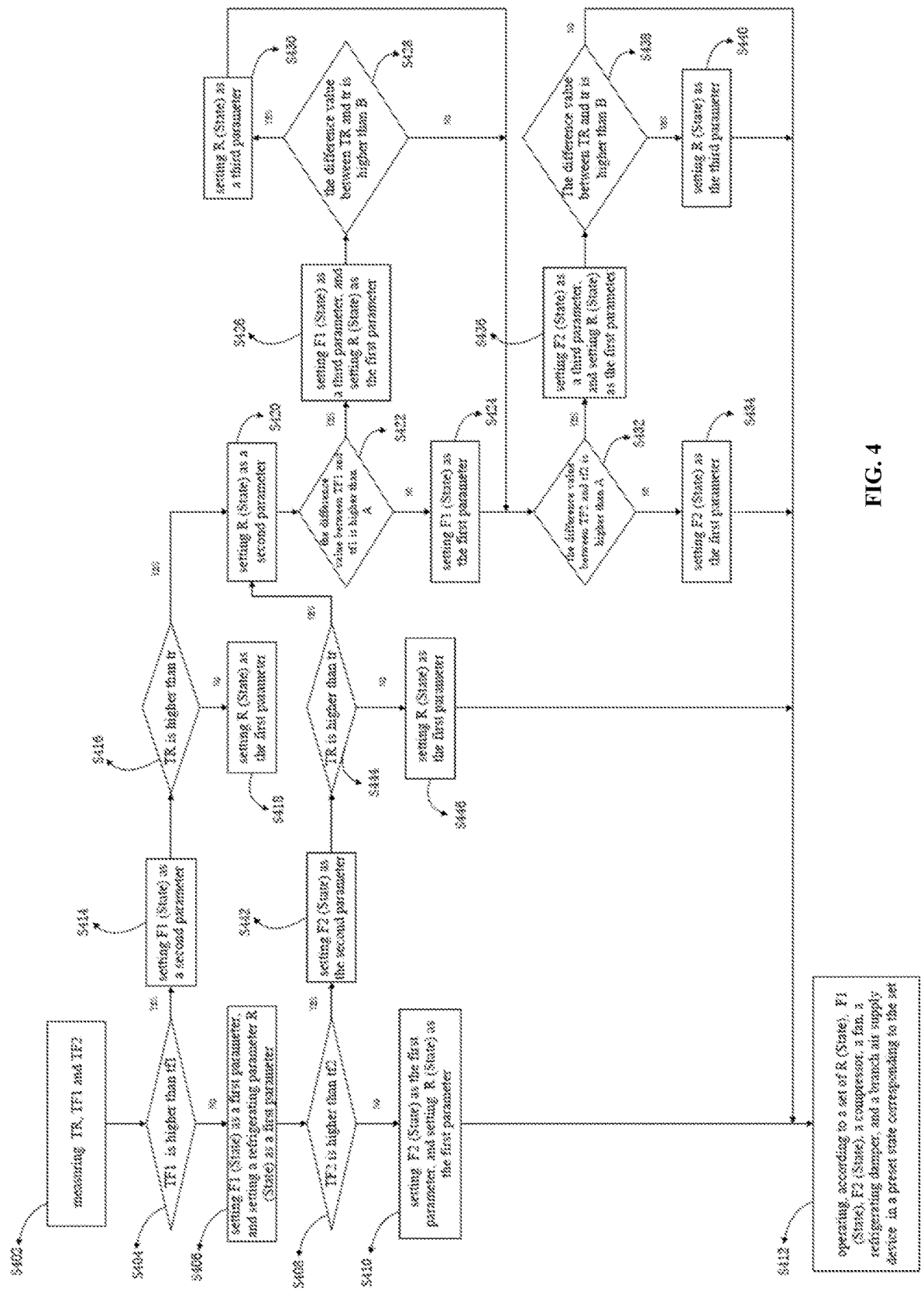
FIG. 4 is a detailed flowchart of a cooling control method for a refrigerator according to an embodiment of the present invention.

In some optional embodiments, the refrigerator 100 can achieve higher technical effects by further optimization and configuration on the above steps. The cooling control method for the refrigerator in the present embodiment may be introduced below in combination with the introduction of an optional execution flow of the present embodiment. The present embodiment is only an example of the execution flow. During the specific implementation, an execution order and operating conditions of some steps may be modified according to specific implementation requirements. FIG. 4 is a detailed flowchart of a cooling control method for a refrigerator according to an embodiment of the present invention. The refrigerator 100 of the present embodiment is provided with a refrigerator compartment 11, a first freezer compartment 12 and a second freezer compartment 13. The cooling control method for the refrigerator comprises the following steps:

step S402, measuring actual temperatures TR, TF1 and TF2 of the refrigerator compartment 11, the first freezer compartment 12 and the second freezer compartment 13;

step S404, determining whether the actual temperature TF1 of the first freezer compartment 12 is higher than a preset first freezing startup temperature tf1; and if yes, executing step S414, and if not, executing step S406;

step S406, setting a first freezing parameter F1 (State) as a first parameter, and setting a refrigerating parameter R (State) as a first parameter;

step S408, determining whether the actual temperature TF2 of the second freezer compartment 13 is higher than a preset second freezing startup temperature tf2; and if yes, executing step S442, and if not, executing step S410;

step S410, setting a second freezing parameter F2 (State) as the first parameter, and setting the refrigerating parameter R (State) as the first parameter;

step S412, operating, according to a set of the refrigerating parameter R (State), the first freezing parameter F1 (State), and the second freezing parameter F2 (State), a compressor, a fan 23, a refrigerating air door, and a branch air supply device 20 in a preset state corresponding to the set;

step S414, setting the first freezing parameter F1 (State) as a second parameter;

step S416, determining whether the actual temperature TR of the refrigerator compartment 11 is higher than a preset refrigerating startup temperature tr; and if yes, executing step S420, and if not, executing step S418;

step S418, setting the refrigerating parameter R (State) as the first parameter and executing step S408;

step S420, setting the refrigerating parameter R (State) as a second parameter;

Step S422, determining whether a difference value between the actual temperature TF1 of the first freezer compartment 12 and the first freezing startup temperature tf1 is higher than a first preset threshold A; and if yes, executing step S426, and if not, executing step S424;

step S424, setting the first freezing parameter F1 (State) as the first parameter and executing step S432;

step S426, setting the first freezing parameter F1 (State) as a third parameter, and setting the refrigerating parameter R (State) as the first parameter;

Step S428, determining whether the difference value between the actual temperature TR of the refrigerator compartment 11 and the refrigerating startup temperature tr is higher than a second preset threshold B; and if yes, executing step S430, and if not, executing step S432;

step S430, setting the refrigerating parameter R (State) as a third parameter;

step S432, determining whether a difference value between the actual temperature TF2 of the second freezer compartment 13 and a second freezing startup temperature tf2 is higher than the first preset threshold A; and if yes, executing step S436, and if not, executing step S434;

step S434, setting the second freezing parameter F2 (State) as the first parameter and executing step S412;

step S436, setting the second freezing parameter F2 (State) as a third parameter, and setting the refrigerating parameter R (State) as the first parameter;

step S438, determining whether the difference value between the actual temperature TR of the refrigerator compartment 11 and the refrigerating startup temperature tr is higher than the second preset threshold B; and if yes, executing step S440, and if not, executing step S412;

step S440, setting the refrigerating parameter R (State) as the third parameter and executing step S412;

step S442, setting the second freezing parameter F2 (State) as the second parameter;

step S444, determining whether the actual temperature TR of the refrigerator compartment 11 is higher than the preset refrigerating startup temperature tr; and if yes, executing step S420, and if not, executing step S446; and step S446, setting the refrigerating parameter R (State) as the first parameter and executing step S412.

In step S402, the actual temperatures TR, TF1, and TF2 of the refrigerator compartment 11, the first freezer compartment 12 and the second freezer compartment 13 may be measured by temperature sensors arranged in the refrigerator compartment 11, the first freezer compartment 12 and the second freezer compartment 13. The types, sizes and mounting positions of the temperature sensors may be set according to actual needs and conditions.

The refrigerating parameter R (State), the first freezing parameter F1 (State), and the second freezing parameter F2 (State) in the above steps each include: a first parameter, a second parameter, and a third parameter which are all different. For example, the first parameter may be 0, the second parameter may be 1, and the third parameter may be 2. The three parameters may indicate whether each storage space needs refrigeration and the urgency degree of refrigeration need of each storage space. For example, the first parameter 0 indicates that refrigeration is not needed, the second parameter 1 and the third parameter 2 indicate that refrigeration is needed, and the third parameter 2 can indicate that the refrigeration need is more urgent than the second parameter 1. The specific values of the above three parameters are merely examples, and are not intended to limit the present invention. In other embodiments, the three parameters may be other different three values.

The different sets of the refrigerating parameter (State), the first freezing parameter F1 (State) and the second freezing parameter F2 (State) in step S436 correspond to different preset states of the compressor, the fan 23, the refrigerating air door and branch air supply device 20. Specifically, A state information table in which preset states corresponding to different parameter sets are pre-stored may be preset. After a parameter set is determined, the corresponding preset state may be obtained by matching. Each preset state includes: rotational speeds of the compressor and the fan 23; an open/close state of the refrigerating air door; and open/close states of the refrigerating air outlet 222, the first freezing air outlet 223 and the second freezing air outlet 224 of the branch air supply device 20.

A specific example of a state information table will be introduced below.

If the first parameter is 0, the second parameter is 1, and the third parameter is 2, the set of the refrigerating parameter R (State), the first freezing parameter F1 (State), and the second freezing parameter F2 (State) may be composed of the following forms according to the determination in the above steps: (0,0,0), (0,0,1), (0,1,0), (0,1,1), (1,0,0), (0, 0, 2), (0, 2, 0), (2, 0, 2), (2, 2, 0), (0, 2, 2), (2, 2, 2).

When the refrigerating parameter R (State), the first freezing parameter F1 (State) and the second freezing parameter F2 (State) are the first parameter 0 respectively, the preset state corresponding to the set (0, 0, 0) is as follows: the compressor and the fan 23 are turned off; the refrigerating air door is closed; and the refrigerating air outlet 222, the first freezing air outlet 223 and the second freezing air outlet 224 of the branch air supply device 20 are all closed.

When the refrigerating parameter R (State) and the first freezing parameter F1 (State) are the first parameter 0 respectively, and the second freezing parameter F2 (State) is the second parameter 1, the preset state corresponding to the set (0, 0, 1) is as follows: the compressor operates at a preset second compressor speed; the fan 23 operates at a preset second fan speed; the refrigerating air door is closed; the refrigerating air outlet 222 and the first freezing air outlet 223 of the branch air supply device 20 are closed; and the second freezing air outlet 224 of the branch air supply device 20 is opened.

When the refrigerating parameter R (State) and the second freezing parameter F2 (State) are the first parameter 0 respectively, and the first freezing parameter F1 (State) is the second parameter 1, the preset state corresponding to the set (0, 1, 0) is as follows: the compressor operates at the second compressor speed; the fan 23 operates at the second fan speed; the refrigerating air door is closed; the refrigerating air outlet 222 and the second freezing air outlet 224 of the branch air supply device 20 are closed; and the first freezing air outlet 223 of the branch air supply device 20 is opened.

When the refrigerating parameter R (State) is the first parameter 0, and the first freezing parameter F1 (State) and the second freezing parameter F2 (State) are the second parameter 1 respectively, the preset state corresponding to the set (0, 1, 1) is as follows: the compressor operates at a third compressor speed which is higher than or equal to the second compressor speed; the fan 23 operates at a third fan speed which is higher than or equal to the second fan speed; the refrigerating air door is closed; the refrigerating air outlet 222 of the branch air supply device 20 is closed; and the first freezing air outlet 223 and the second freezing air outlet 224 of the branch air supply device 20 are opened.

When the refrigerating parameter R (State) is the second parameter 1, and the first freezing parameter F1 (State) and the second freezing parameter F2 (State) are the first parameter 0 respectively, the preset state corresponding to the set (1, 0, 0) is as follows: the compressor operates at a first compressor speed which is less than or equal to the second compressor speed; the fan 23 operates at a first fan speed which is less than or equal to the second fan speed; the refrigerating air door is opened; the refrigerating air outlet 222 of the branch air supply device 20 is opened; and the first freezing air outlet 223 and the second freezing air outlet 224 of the branch air supply device 20 are closed.

When the refrigerating parameter R (State) and the first freezing parameter F1 (State) are the first parameter 0 respectively, and the second freezing parameter F2 (State) is the third parameter 2, the preset state corresponding to the set (0, 0, 2) is as follows: the compressor operates at a fourth compressor speed which is higher than or equal to the third compressor speed; the fan 23 operates at a fourth fan speed which is higher than or equal to the third fan speed; the refrigerating air door is closed; the refrigerating air outlet 222 and the first freezing air outlet 223 of the branch air supply device 20 are closed; and the second freezing air outlet 224 of the branch air supply device 20 is opened.

When the refrigerating parameter R (State) and the second freezing parameter F2 (State) are the first parameter 0 respectively, and the first freezing parameter F1 (State) is the third parameter 2, the preset state corresponding to the set (0, 2, 0) is as follows: the compressor operates at the fourth compressor speed; the fan 23 operates at the fourth fan speed; the refrigerating air door is closed; the refrigerating air outlet 222 and the second freezing air outlet 224 of the branch air supply device 20 are closed; and the first freezing air outlet 223 of the branch air supply device 20 is opened.

When the refrigerating parameter R (State) and the second freezing parameter F2 (State) are the third parameter 2 respectively, and the first freezing parameter F1 (State) is the first parameter 0, the preset state corresponding to the set (2, 0, 2) is as follows: the compressor operates at a fifth compressor speed which is higher than or equal to the fourth compressor speed; the fan 23 operates at a fifth fan speed which is higher than or equal to the fourth fan speed; the refrigerating air door is opened; the refrigerating air outlet 222 and the second freezing air outlet 224 of the branch air supply device 20 are opened; and the first freezing air outlet 223 of the branch air supply device 20 is closed.

When the refrigerating parameter R (State) and the first freezing parameter F1 (State) are the third parameter 2 respectively, and the second freezing parameter F2 (State) is the first parameter 0, the preset state corresponding to the set (2, 2, 0) is as follows: the compressor operates at the fifth compressor speed; the fan 23 operates at the fifth fan speed; the refrigerating air door is opened; the refrigerating air outlet 222 and the first freezing air outlet 223 of the branch air supply device 20 are opened; and the second freezing air outlet 224 of the branch air supply device 20 is closed.

When the refrigerating parameter R (State) is the first parameter 0, and the first freezing parameter F1 (State) and the second freezing parameter F2 (State) are the third parameter 2 respectively, the preset state corresponding to the set (0, 2, 2) is as follows: the compressor operates at a sixth compressor speed which is higher than or equal to the fifth compressor speed; the fan 23 operates at a sixth fan speed which is higher than or equal to the fifth fan speed; the refrigerating air door is closed; the refrigerating air outlet 222 of the branch air supply device 20 is closed; and the first freezing air outlet 223 and the second freezing air outlet 224 are opened.

When the refrigerating parameter R (State), the first freezing parameter F1 (State) and the second freezing parameter F2 (State) are the third parameter 2 respectively, the preset state corresponding to the set (2, 2, 2) is as follows: the compressor operates at a seventh compressor speed which is higher than or equal to the sixth compressor speed; the fan 23 operates at a seventh fan speed which is higher than or equal to the sixth fan speed; the refrigerating air door is opened; and the refrigerating air outlet 222, the first freezing air outlet 223 and the second freezing air outlet 224 of the branch air supply device 20 are all opened.

After the corresponding preset state of the compressor, the fan 23, the refrigerating air door and the branch air supply device 20 is determined according to the set of the refrigerating parameter R (State), the first freezing parameter F1 (State) and the second freezing parameter F2 (State), the compressor, the fan 23, the refrigerating air door and the branch air supply device 20 can be operated in the determined preset state.

The specific values of the compressor speed and the fan speed may be set according to actual needs and conditions.

In most cases, the compressor speed and the fan speed are directly proportional to an ambient temperature in a place where the refrigerator 100 is located, that is, the higher the ambient temperature, the greater the compressor speed and the fan speed. For example, when the ambient temperature is less than 16° C., the first compressor speed is 1200; the second compressor speed is 1380; the third compressor speed is 1800; the fourth compressor speed is 2160; the fifth compressor speed is 2280; the sixth compressor speed is 2400; and the seventh compressor speed is 2580. When the ambient temperature is higher than or equal to 16° C. and less than 28° C., the first compressor speed is 1380; the second compressor speed is 1590; the third compressor speed is 1980; the fourth compressor speed is 2580; the fifth compressor speed 2700; the sixth compressor speed is 2820; and the seventh compressor speed is 3000. When the ambient temperature is higher than or equal to 28° C. and less than 35° C., the first compressor speed is 1590; the second compressor speed is 1800; the third compressor speed is 2160; the fourth compressor speed is 3000; the fifth compressor speed is 3120; the sixth compressor speed is 3240; and the seventh compressor speed is 3420. When the ambient temperature is higher than or equal to 35° C. and less than 43° C., the first compressor speed is 1800; the second compressor speed is 1980; the third compressor speed is 2580; the fourth compressor speed is 3420; the fifth compressor speed is 3540; the sixth compressor speed is 3660; and the seventh compressor speed is 3840. When the ambient temperature is higher than or equal to 43° C., the first compressor speed is 2160; the second compressor speed is 3000; the third compressor speed is 3420; the fourth compressor speed is 3840; and the fifth compressor speed, the sixth compressor speed and the seventh compressor speed are 4200 respectively.

When the ambient temperature is less than 16° C., the first fan speed is 1300; the second fan speed is 1370; the third fan speed is 1510; the fourth fan speed is 1650; the fifth fan speed is 1720; the sixth fan speed is 1790; and the seventh fan speed is 1860. When the ambient temperature is higher than or equal to 16° C. and less than 28° C., the first fan speed is 1370; the second fan speed is 1440; the third fan speed is 1580; the fourth fan speed is 1720; the fifth fan speed is 1790; the sixth fan speed is 1860; and the seventh fan speed is 1930. When the ambient temperature is higher than or equal to 28° C. and less than 35° C., the first fan speed is 1440; the second fan speed is 1510; the third fan speed is 1650; the fourth fan speed is 1790; the fifth fan speed is 1860; the sixth fan speed is 1930; and the seventh fan speed is 2000. When the ambient temperature is higher than or equal to 35° C. and less than 43° C., the first fan speed is 1510; the second fan speed is 1580; the third fan speed is 1720; the fourth fan speed is 1860; the fifth fan speed is 1930; the sixth fan speed is 2000; and the seventh fan speed is 2070. When the ambient temperature is higher than or equal to 43° C., the first fan speed is 1650; the second fan speed is 1790; the third fan speed is 1860; the fourth fan speed is 1930; the fifth fan speed is 2000; the sixth fan speed is 2070; and the seventh fan speed is 2140. It should be noted that the specific values of the above compressor speeds and fan speeds are merely examples, and are not intended to limit the present invention.

The first preset threshold A and the second preset threshold B in the above steps are both values greater than zero. According to the cooling control method for the refrigerator of the present embodiment, whether or not the refrigerator compartment 11 has a refrigeration need may be determined only when the first freezer compartment 12 or the second freezer compartment 13 needs to be refrigerated. If the refrigerator compartment 11 also has the refrigeration need, the freezer compartment that needs to be refrigerated may be refrigerated only when the actual temperature of the first freezer compartment 12 or the second freezer compartment 13 (having a difference value from the preset freezing startup temperature being greater than the first preset threshold) is excessively high. If the actual temperature of the first freezer compartment 12 or the second freezer compartment 13 is only higher than the freezing startup temperature and is not excessively high, the refrigerator compartment 11 is preferentially refrigerated. Moreover, when the actual temperature of the first freezer compartment 12 or the second freezer compartment 13 (having a difference value from the preset freezing startup temperature being greater than the first preset threshold) is excessively high, the refrigerating parameter needs to be reset as the first parameter. That is, the refrigerator compartment does not need to be refrigerated by default. In this case, only when the difference value between the actual temperature of the refrigerator compartment 11 and the refrigerating startup temperature is higher than the second preset threshold, that is, the temperature of the refrigerator compartment is also excessively high, the refrigerating parameter is then set as the third parameter so as to refrigerate the refrigerator compartment.

If the actual temperature of the first freezer compartment 12 is less than or equal to the first freezing startup temperature and the actual temperature of the second freezer compartment 13 is less than or equal to the second freezing startup temperature, that is, when none of the freezer compartments needs to be refrigerated, the refrigerating parameter may be directly set as the first parameter, that is, the refrigerator compartment does not need to be refrigerated by default, so that the startup frequency of devices, such as a compressor may be reduced, and the energy consumption may be effectively reduced.

It should be noted that, in step S412, the compressor, the fan 23, the refrigerating air door and the branch air supply device 20 may operate for a preset duration according to a preset state corresponding to a set so as to satisfy the refrigerating demand of each storage space. During the process of operating for the preset duration, the process of measuring a temperature and setting a parameter is no longer performed, such that a case in which a storage space is determined not to be refrigerated once an actual temperature of the storage space is slightly lowered, resulting in a frequent change in an operating state of devices, such as a compressor, may be avoided. After the preset duration of operation, the above steps may be re-executed to perform the refrigeration control again.

The cooling control method for the refrigerator of the present embodiment can realize separate refrigeration of a single storage space or simultaneous refrigeration of a plurality of storage spaces, determine a storage space that needs to be refrigerated more urgently in comprehensive consideration of the actual temperature conditions of the refrigerator compartment 11, the first freezer compartment 12 and the second freezer compartment 13 so as to implement refrigeration more reasonably and satisfy the refrigeration demand of each storage space, and improve the temperature stability of each storage space of the refrigerator.

Further, according to the cooling control method for the refrigerator of the present embodiment, according to a set of the refrigerating parameter, the first freezing parameter and the second freezing parameter, the compressor, the fan 23, the refrigerating air door and the branch air supply device 20 may operate in a preset state corresponding to this set. The temperature of a storage space is prevented from being excessively high or too low due to poor temperature uniformity and stability of each storage space. The energy consumption can be effectively reduced and the storage effect of food in each storage space can be promoted.

Figure 5:
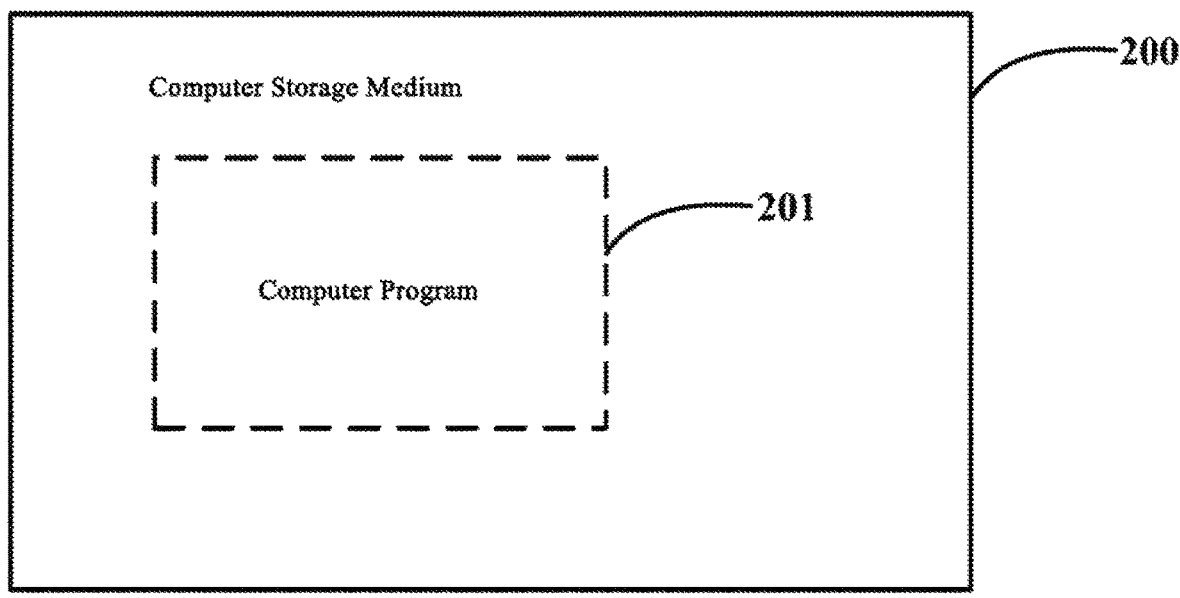
FIG. 5 is a schematic diagram of a computer storage medium according to an embodiment of the present invention.

The present embodiment further provides a computer storage medium 200. FIG. 5 is a schematic diagram of a computer storage medium 200 according to an embodiment of the present invention. The computer storage medium 200 stores computer programs 201, and when the computer programs 201 are running, a device in which the computer storage medium 200 is located is caused to execute the cooling control method for the refrigerator of any of the above embodiments. The device in which the computer storage medium 200 is located is the refrigerator 100, and the refrigerator 100 can perform the cooling control method for the refrigerator according to any of the above embodiments.

The computer storage medium 200 of the present embodiment may be an electronic memory such as a flash memory, an EEPROM (Electrically Erasable Programmable Read-Only Memory), an EPROM, a hard disk, or a ROM. The computer storage medium 200 has a storage space for the computer programs 201 for performing any of the method steps in the above method. These computer programs 201 can be read from or written to one or more computer program products. These computer program products include program code carriers such as a hard disk, a compact disk (CD), a memory card or a floppy disk. When the computer programs 201 run on a device in which the computer storage medium 200 is located, various steps in the method described above can be performed.

So far, those skilled in the art should recognize that although multiple specific embodiments of the present invention have been illustrated and described in detail, various other modifications or variations conforming to the principle of the present invention may be determined or derived directly on the basis of the content disclosed by the present invention without departing from the spirit and scope of the present invention. Thus, the scope of the present invention should be understood and deemed to include all of these and other modifications or variations.

What is claimed is:

1. A cooling control method for a refrigerator, wherein the refrigerator comprises: a refrigerator body in which a refrigerator compartment and at least one freezer compartment arranged below the refrigerator compartment are defined; a door body arranged on the front side of the refrigerator body for a user to open or close the refrigerator compartment and the at least one freezer compartment; a refrigeration system comprising a compressor and configured to supply cold capacity to the refrigerator compartment and the at least one freezer compartment; a branch air supply device comprising a fan and provided with a refrigerating air outlet which is in controlled communication with the refrigerator compartment and a freezing air outlet which is in controlled communication with the at least one freezer compartment, so as to supply the cold capacity supplied by the refrigeration system into the refrigerator compartment and/or the at least one freezer compartment in a controlled manner; and the cooling control method comprises the following steps:

measuring an actual temperature of the at least one freezer compartment, and setting a freezing parameter of the at least one freezer compartment according to the actual temperature of the at least one freezer compartment;

when the actual temperature of the at least one freezer compartment is higher than a preset freezing startup temperature, measuring an actual temperature of the refrigerator compartment, and setting a refrigerating parameter of the refrigerator compartment according to the actual temperature of the refrigerator compartment;

when the actual temperature of the refrigerator compartment is higher than a preset refrigerating startup temperature, and a difference value between the actual temperature of the at least one freezer compartment and the preset freezing startup temperature is higher than a first preset threshold, resetting the refrigerating parameter and the freezing parameter, wherein the refrigerating parameter and the freezing parameter each include a first parameter, a second parameter and a third parameter; and operating, according to a set of the refrigerating parameter and the freezing parameter, the compressor, the fan and the branch air supply device in a preset state corresponding to the set.

2. The cooling control method for the refrigerator according to claim 1, wherein the at least one freezer compartment includes a first freezer compartment and a second freezer compartment; the freezing parameter includes a first freezing parameter of the first freezer compartment and a second freezing parameter of the second freezer compartment; and the freezing air outlet of the branch air supply device includes a first freezing air outlet which is in controlled communication with the first freezer compartment and a second freezing air outlet which is in controlled communication with the second freezer compartment; and a step of setting the first freezing parameter comprises:
determining whether an actual temperature of the first freezer compartment is higher than a preset first freezing startup temperature; and if yes, setting the first freezing parameter as the second parameter, and if not, setting the first freezing parameter as the first parameter; and a step of setting the second freezing parameter comprises:
determining whether an actual temperature of the second freezer compartment is higher than a preset second freezing startup temperature; and if yes, setting the second freezing parameter as the second parameter, and if not, setting the second freezing parameter as the first parameter.

3. The cooling control method for the refrigerator according to claim 2, wherein when the actual temperature of the first freezer compartment is higher than the preset first freezing startup temperature or the actual temperature of the second freezer compartment is higher than the preset second freezing startup temperature, a step of setting the refrigerating parameter of the refrigerator compartment comprises:
determining whether the actual temperature of the refrigerator compartment is higher than the preset refrigerating startup temperature; and
if yes, setting the refrigerating parameter as the second parameter, and
if not, setting the refrigerating parameter as the first parameter.

4. The cooling control method for the refrigerator according to claim 3, wherein:
when the actual temperature of the first freezer compartment is less than or equal to the preset first freezing startup temperature or the actual temperature of the second freezer compartment is less than or equal to the preset second freezing startup temperature, the refrigerating parameter is set as the first parameter.

5. The cooling control method for the refrigerator according to claim 4, wherein the step of resetting the refrigerating parameter and the freezing parameter comprises:
determining whether a difference value between the actual temperature of the first freezer compartment and the preset first freezing startup temperature is higher than the first preset threshold; and if yes, setting the refrigerating parameter as the first parameter, and setting the first freezing parameter as the third parameter; and if not, setting the first freezing parameter as the first parameter;

determining whether a difference value between the actual temperature of the second freezer compartment and the preset second freezing startup temperature is higher than the first preset threshold; and if yes, setting the refrigerating parameter as the first parameter, and setting the second freezing parameter as the third parameter; and if not, setting the second freezing parameter as the first parameter.

6. The cooling control method for the refrigerator according to claim 5, after the step of resetting the refrigerating parameter, further comprising:
determining whether a difference value between the actual temperature of the refrigerator compartment and the preset refrigerating startup temperature is higher than a second preset threshold; and
if yes, setting the refrigerating parameter as the third parameter, and
if not, keeping the refrigerating parameter being the first parameter unchanged.

7. The cooling control method for the refrigerator according to claim 6, wherein:
when the refrigerating parameter, the first freezing parameter and the second freezing parameter are the first parameter respectively, the compressor and the fan are turned off; the refrigerating air door is closed; and the refrigerating air outlet, the first freezing air outlet and the second freezing air outlet of the branch air supply device are all closed.

8. The cooling control method for the refrigerator according to claim 7, wherein:
when the refrigerating parameter and the first freezing parameter are the first parameter respectively, and the second freezing parameter is the second parameter, the compressor is operated at a preset second compressor speed; the fan is operated at a preset second fan speed; the refrigerating air door is closed; the refrigerating air outlet and the first freezing air outlet of the branch air supply device are closed; and the second freezing air outlet is opened.

9. The cooling control method for the refrigerator according to claim 8, wherein:
when the refrigerating parameter and the second freezing parameter are the first parameter respectively, and the first freezing parameter is the second parameter, the compressor is operated at the second compressor speed; the fan is operated at the second fan speed; the refrigerating air door is closed; the refrigerating air outlet and the second freezing air outlet of the branch air supply device are closed; and the first freezing air outlet of the branch air supply device is opened.

10. The cooling control method for the refrigerator according to claim 9, wherein:
when the refrigerating parameter is the first parameter, and the first freezing parameter and the second freezing parameter are the second parameter respectively, the compressor is operated at a third compressor speed which is higher than or equal to the second compressor speed; the fan is operated at a third fan speed which is higher than or equal to the second fan speed; the refrigerating air door is closed; the refrigerating air outlet of the branch air supply device is closed; and the first freezing air outlet and the second freezing air outlet of the branch air supply device are opened.

11. The cooling control method for the refrigerator according to claim 10, wherein:

when the refrigerating parameter is the second parameter, and the first freezing parameter and the second freezing parameter are the first parameter respectively, the compressor is operated at a first compressor speed which is less than or equal to the second compressor speed; the fan is operated at a first fan speed which is less than or equal to the second fan speed; the refrigerating air door is opened; the refrigerating air outlet of the branch air supply device is opened; and the first freezing air outlet and the second freezing air outlet of the branch air supply device are closed.

12. The cooling control method for the refrigerator according to claim 11, wherein:

when the refrigerating parameter and the first freezing parameter are the first parameter respectively, and the second freezing parameter is the third parameter, the compressor is operated at a fourth compressor speed which is higher than or equal to the third compressor speed; the fan is operated at a fourth fan speed which is higher than or equal to the third fan speed; the refrigerating air door is closed; the refrigerating air outlet and the first freezing air outlet of the branch air supply device are closed; and the second freezing air outlet of the branch air supply device is opened.

13. The cooling control method for the refrigerator according to claim 12, wherein:

when the refrigerating parameter and the second freezing parameter are the first parameter respectively, and the first freezing parameter is the third parameter, the compressor is operated at the fourth compressor speed; the fan is operated at the fourth fan speed; the refrigerating air door is closed; the refrigerating air outlet and the second freezing air outlet of the branch air supply device are closed; and the first freezing air outlet of the branch air supply device is opened.

14. The cooling control method for the refrigerator according to claim 13, wherein:

when the refrigerating parameter and the second freezing parameter are the third parameter respectively, and the first freezing parameter is the first parameter, the compressor is operated at a fifth compressor speed which is higher than or equal to the fourth compressor speed; the fan is operated at a fifth fan speed which is higher than or equal to the fourth fan speed; the refrigerating air door is opened; the refrigerating air outlet and the second freezing air outlet of the branch air supply device are opened; and the first freezing air outlet of the branch air supply device is closed.

15. The cooling control method for the refrigerator according to claim 14, wherein:

when the refrigerating parameter and the first freezing parameter are the third parameter respectively, and the second freezing parameter is the first parameter, the compressor is operated at the fifth compressor speed; the fan is operated at the fifth fan speed; the refrigerating air door is opened; the refrigerating air outlet and the first freezing air outlet of the branch air supply device are opened; and the second freezing air outlet of the branch air supply device is closed;

when the refrigerating parameter is the first parameter, and the first freezing parameter and the second freezing parameter are the third parameter respectively, the compressor is operated at a sixth compressor speed which is higher than or equal to the fifth compressor speed; the fan is operated at a sixth fan speed which is higher than or equal to the fifth fan speed; the refrigerating air door is closed; the refrigerating air outlet of the branch air supply device is closed; and the first freezing air outlet and the second freezing air outlet of the branch air supply device are opened; and when the refrigerating parameter, the first freezing parameter and the second freezing parameter are the third parameter respectively, the compressor is operated at a seventh compressor speed which is higher than or equal to the sixth compressor speed; the fan is operated at a seventh fan speed which is higher than or equal to the sixth fan speed; the refrigerating air door is opened; and the refrigerating air outlet, the first freezing air outlet and the second freezing air outlet of the branch air supply device are all opened.

* * * * *